United States Patent [19]

Steiner et al.

[11] Patent Number: 5,325,587
[45] Date of Patent: Jul. 5, 1994

[54] WIRE STRIPPER

[75] Inventors: Richard A. Steiner, East Haddam; Charles J. Gargano, Guilford, both of Conn.

[73] Assignee: Rostra Tool Company, Branford, Conn.

[21] Appl. No.: 952,905

[22] PCT Filed: Mar. 16, 1992

[86] PCT No.: PCT/US92/02060

§ 371 Date: Nov. 19, 1992

§ 102(e) Date: Nov. 19, 1992

[87] PCT Pub. No.: WO93/18895

PCT Pub. Date: Sep. 30, 1993

[51] Int. Cl.$^5$ .............................. B21F 13/00
[52] U.S. Cl. ............................ 30/91.2; 30/90.1
[58] Field of Search ............ 30/90.1, 90.9, 91.1, 30/91.2, 90.4

[56] References Cited

U.S. PATENT DOCUMENTS 4,852,255 8/1989 Hochfeld ................... 30/91.2 X
5,036,734 8/1991 Morrow ..................... 30/90.1 X

*Primary Examiner*—Douglas D. Watts
*Attorney, Agent, or Firm*—John H. Crozier

[57] ABSTRACT

In a preferred embodiment, a wire stripper, which includes: a generally elongate lower body member having first and second ends; a generally elongate upper clamping member having first and second ends and generally overlying the lower body member; an integral flexible hinge member joining the lower body member and the upper clamping member intermediate the respective first and second ends; an integral biaser disposed at and between the first ends, so as to bias the first ends apart by rotation of the upper clamping member around the flexible hinge member, and so as to draw the second ends toward each other, and to permit the second ends to be drawn apart by the further tensioning of the biaser by the rotation of the upper clamping member around the hinge member; and a cutting blade disposed in the second end of the lower body member along the major axis of the lower body member and extending above the upper surface thereof, such that a cable inserted between the second ends when the first ends are drawn together will come into cutting engagement with the cutting blade when the second ends are subsequently drawn together, and one or more layers of the cable will be severed by the cutting blade when the wire stripper is rotated about the cable in a plane orthogonal to the axis of the cable.

21 Claims, 3 Drawing Sheets

WIRE STRIPPER

TECHNICAL FIELD

The present invention relates to wire strippers generally and, more particularly, but not by way of limitation, to a novel wire stripper of one piece molded construction that is simple to use and economical to manufacture.

BACKGROUND ART

"Wire" usually refers to a central electrical conductor surrounded by a layer of insulation, while "cable" usually refers to a central conductor surrounded by insulation, with a second conductor of foil or braid surrounding the first layer of insulation and a second layer of insulation surrounding the second conductor. "Wire" and "cable" at times may be used herein interchangeably, as will be clear from the context.

One type of wire stripper long known in the art comprises a pair of opposed blades having handles at one end thereof, which handles are pivotally attached together between the blade ends and the handle ends. The blades have opposed, aligned pairs of sharp notches along their lengths such that when the blades are manually urged together, a selected pair of notches closes about, and cuts through, the insulation on a wire. Rotating the stripper in its closed position in a circular motion of at least 180 degrees about the wire in a plane perpendicular to the axis of the wire severs the insulation and allows it to be pulled off the end of the wire. The pairs of notches are variously sized to cut insulation on wires or cables of several different diameters. While this type of wire stripper is somewhat satisfactory, it is inconvenient to use, in part, because of limitations of a human arm and wrist in rotating the stripper. Such type of wire stripper is also relatively expensive to construct.

A recent development in wire strippers has provided a wire stripper of molded plastic material which is generally in the shape of a clothespin, with the proximal ends of two straight members being biased together by an integral spring member, the bridging member being put in a tensioned state by means of the manual forcing together of the distal ends of the straight members. Removably disposed in the proximal end of one of the straight members is a cassette containing two cutting blades in selected positions. In use, the stripper is "opened" by the manual forcing together of the distal ends of the straight members, the cable is placed against a stop in the other one of the straight members, and the distal ends of the straight members are released so as to bring the cable in cutting engagement with the blades. Relative rotation of the wire stripper and the cable about the axis of the latter causes the cutting through of the outer and inner layers of the cable.

While the body of the latter wire stripper is relatively economically manufactured, the cassette required represents a second part to be manufactured and additional manufacturing expense.

Another disadvantage of that wire stripper is that the positions of the cuts are predetermined by the relative positions of the cutting blades and the stop and cannot be changed without changing the cassette. Even then, the degree of flexibility in choosing positions is somewhat limited.

A further disadvantage of that wire stripper is that it is difficult to rotate around the cable with one finger.

Accordingly, it is a principal object of the present invention to provide a wire stripper that is easy to use and economical to manufacture.

It is a further object of the invention to provide such a wire stripper that is of one piece construction.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, a wire stripper, comprising: a generally elongate lower body member having first and second ends; a generally elongate upper clamping member having first and second ends and generally overlying said lower body member; an integral flexible hinge member joining said lower body member and said upper clamping member intermediate said respective first and second ends; integral biasing means disposed at and between said first ends, so as to bias said first ends apart by rotation of said upper clamping member around said flexible hinge member, and so as to draw said second ends toward each other, and to permit said second ends to be drawn apart by the further tensioning of said biasing means by the rotation of said upper clamping member around said hinge member; and a cutting blade disposed in said second end of said lower body member along the major axis of said lower body member and extending above the upper surface thereof, such that a cable inserted between said second ends when said first ends are drawn together will come into cutting engagement with said cutting blade when said second ends are subsequently drawn together, and one or more layers of said cable will be severed by said cutting blade when said wire stripper is rotated about said cable in a plane orthogonal to the axis of said cable.

BRIEF DESCRIPTION OF DRAWING

Understanding of the present invention and the various aspects thereof will be facilitated by reference to the accompanying drawing figures, submitted for purposes of illustration only and not intended to define the scope of the invention, on which.

BEST MODE FOR CARRYING OUT THE INVENTION

Figure 1:
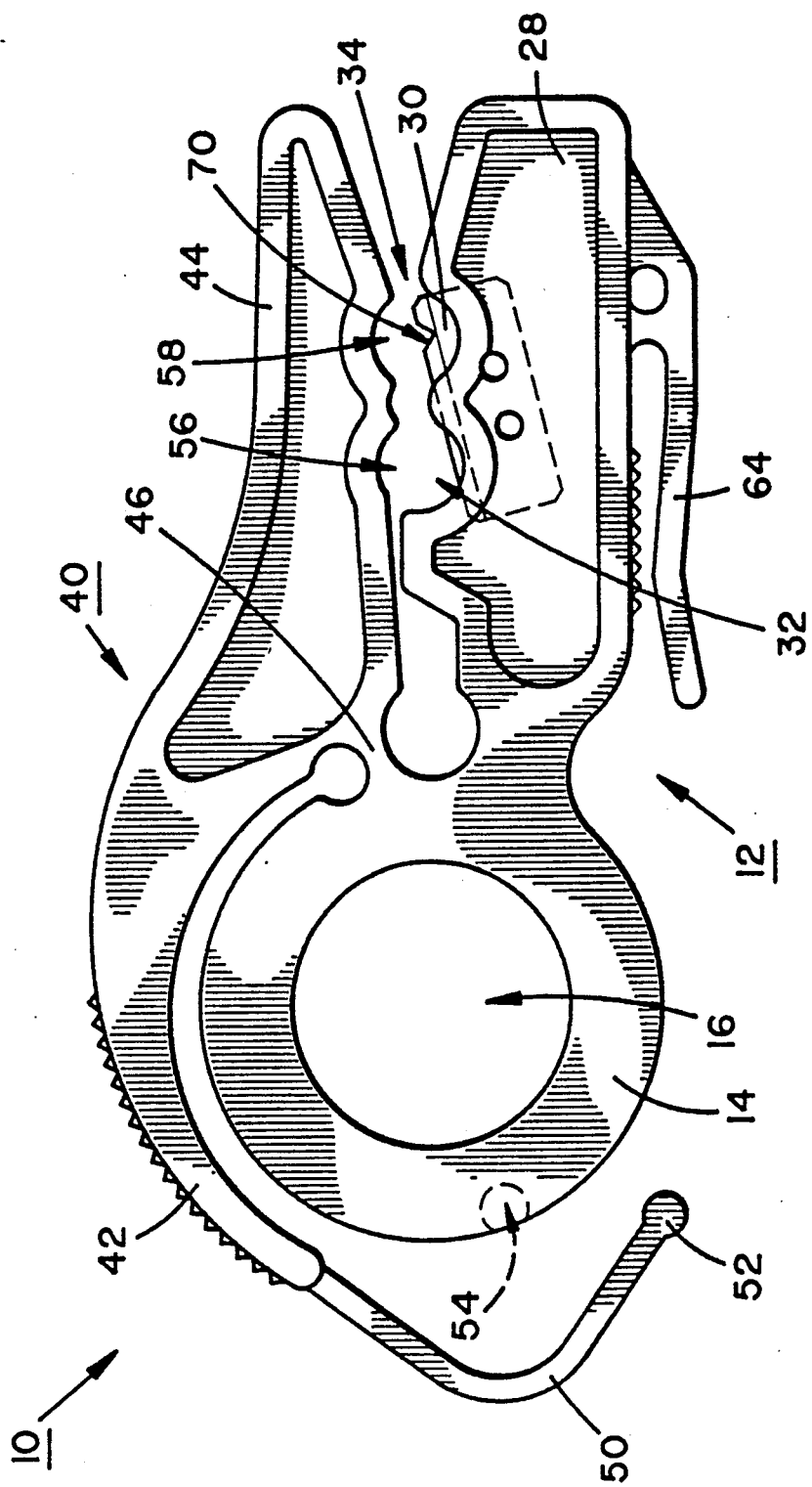
FIG. 1 is an enlarged, side elevational view of one embodiment of a wire stripper constructed according to the present invention shown as it is produced.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the elements(s) may be seen also on other views.

FIG. 1 illustrates a wire stripper, generally indicated by the reference numeral 10, constructed according to the present invention, after it has been injection molded of a suitable, relatively rigid, thermoplastic material. Wire stripper 10 includes a lower body portion, generally indicated by the reference numeral 12, the lower body portion having first and second ends. Lower body portion 12 includes a circular member 14 comprising the first end thereof and defining therethrough a circular opening 16. The second end of lower body portion 12 comprises a blade holding portion 28 into which is integrally molded a cutting blade 30 which protrudes above the lower body portion into semicircular openings 32 and 34 defined in the upper surface of the lower body portion.

An upper clamping member, generally indicated by the reference numeral 40, having first and second ends 42 and 44, is attached to lower body portion 12 at approximately the midpoints of each by a relatively thin (in side view), flexible hinge member 46. First end 42 terminates in an integral, resilient spring arm 50 having a cylindrical member 52 at the distal end thereof. Circular member 14 includes, defined in the outer periphery thereof, a channel 54 sized for the insertion therein of cylindrical member 52. Second end 44 includes semicircular openings 56 and 58 defined in the lower surface thereof in facing relationship with semicircular openings 32 and 34, respectively, in lower body member 12.

Lower body portion 12 may include an integral, resilient clip 64, so that wire stripper 10 may be conveniently clipped to a pocket or the like.

It will be noted that blade 30 includes a V-notch 70 defined in a portion thereof. The advantages of the same are described in U.S. Pat. No. 4,985,996, issued Jan. 22, 1991, to Richard A. Steiner, titled WIRE STRIPPER WITH V-NOTCH BLADE, and assigned to the assignee of the present invention, which patent and the references cited therein are incorporated by reference hereinto.

Figure 2:
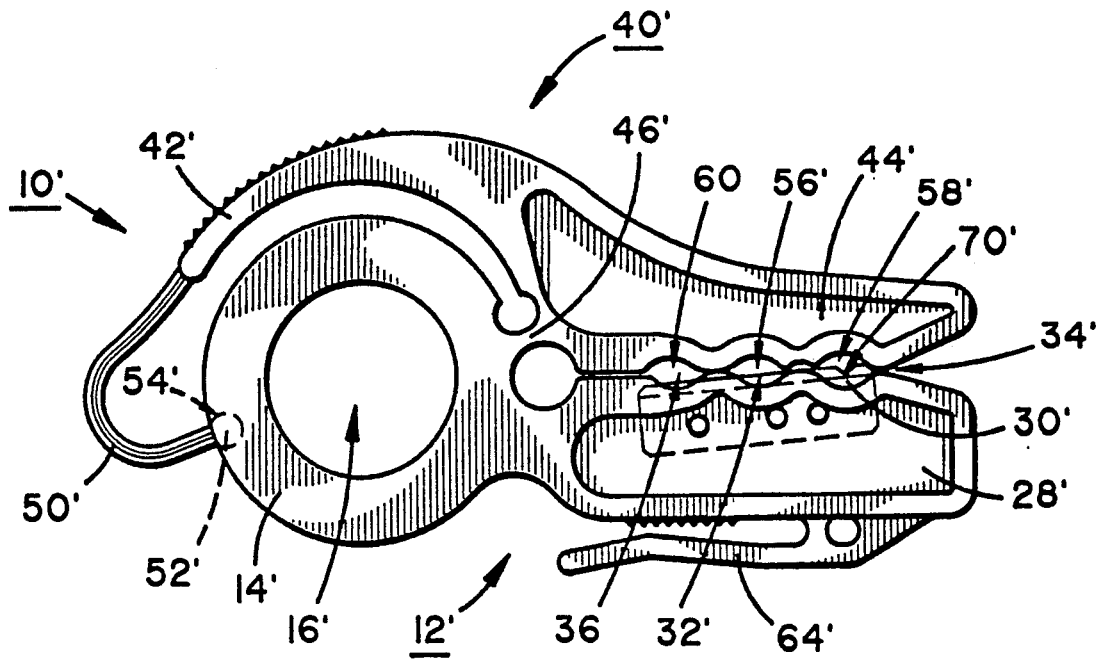
FIG. 2 is a side elevational view of another embodiment of a wire stripper constructed according to the present invention, shown in closed position.

FIG. 2 illustrates another wire stripper, generally indicated by the reference numeral 10', identical to wire stripper 10 described above, with the exception of a cutting blade 30' which will be described below. As is shown on FIG. 2, spring arm 50' has been bent so that cylindrical member 52' has been inserted in channel 54'. This has tensioned spring arm 50', so as to rotatingly bias upper clamping 40 clockwise by the flexure of hinge member 46'. This movement has drawn second end 44'.toward blade holding portion 28' the movement being terminated by the engagement of a flange 76 formed on the lower surface of the second end with a flange 78 formed on the upper surface of the blade holding portion. Thus shown, wire stripper 10' is in its closed position.

Figure 3:
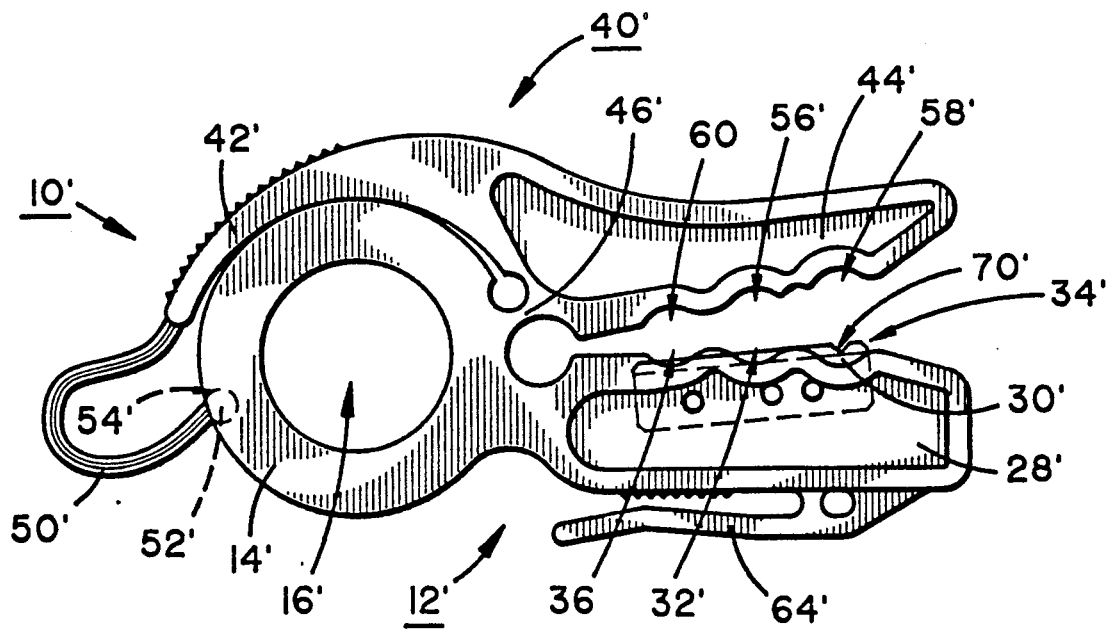
FIG. 3 is a side elevational view of the wire stripper of FIG. 2, shown in open position.

FIG. 3 illustrates wire stripper 10' moved to its open position. This has been achieved by the user thereof inserting an index finger through hole 16', placing a thumb on first end 42', and pressing the index finger and thumb together. This action causes upper clamping member 40 to rotate counterclockwise by the flexure of hinge member 46' to the position shown with the lower edge of first end 42' engaging the upper edge of circular member 14' and further tensioning spring arm 50'. In the open position of wire stripper 10', second end 44' has been moved away from blade holding portion 28'.

Figure 4:
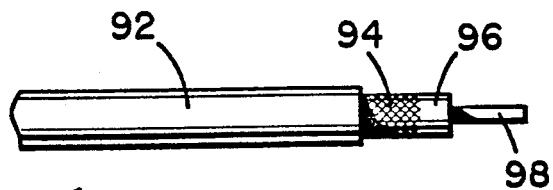
FIG. 4 is a side elevational view of a cable with layers thereof stripped with the wire stripper of FIGS. 2 and 3.
Figure 5:
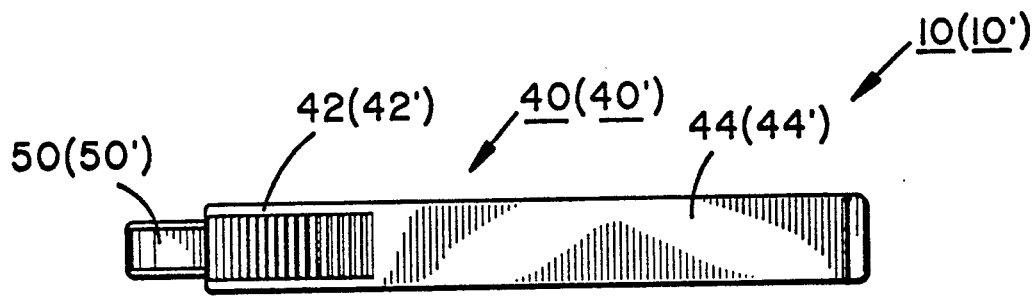
FIG. 5 is a top plan view of either of the wire strippers of FIGS. 1 and 2.
Figure 6:
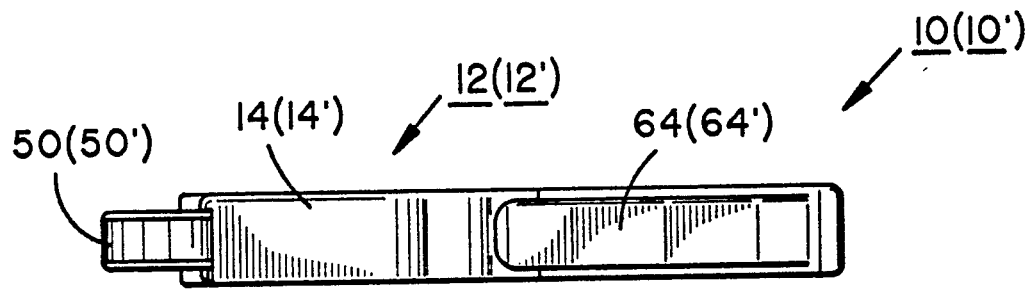
FIG. 6 is a bottom plan view of either of the wire strippers of FIGS. 1 and 2.

Reference now should be made to FIG. 4 which shows a cable 90 after being cut and stripped with wire stripper 10'. Cable 90 includes an outer insulation jacket 92, a braid layer 94, an insulation core 96, and a center conductor 98.

Referring also to FIGS. 2 and 3, the procedure by which cable 90 has been cut and stripped will now be described.

First, wire stripper 10' is opened (FIG. 3). Next, the end of cable 90 is inserted a first selected distance into the space defined between semicircular openings 34' and 58'. Wire stripper 10' is then released and allowed to close (FIG. 2). This brings cable 90 into cutting relationship with cutting blade 30' which protrudes substantially into semicircular opening 34'. With an index finger inserted into opening 16', wire stripper 10' is rotated relative to cable 90 about the axis of the cable in a plane orthogonal to the axis of the cable, so that cutting blade 30' cuts through and severs the outer-layers of the cable down to center conductor 98. Notch 70' assists in this operation as is more fully described in the above-referenced patent. The outer layers of cable 90 can then be slid off the end of the cable.

Next, wire stripper 10' is opened (FIG. 3) and the end of cable 90 is inserted a second selected distance (greater than the first selected distance) into the space defined between semicircular openings 32' and 56'. Wire stripper 10' is then released and allowed to close (FIG. 2). This brings cable 90 into cutting relationship with cutting blade 30' which protrudes into semicircular opening 32' a distance less than the distance cutting blade protruded into semicircular opening 34. With an index finger inserted into opening 16', wire stripper 10' is rotated relative to cable 90 about the axis of the cable so that cutting blade 30' cuts through and severs braid layer 94, and the cut portion of the braid can then be slid off the end of the cable.

In a similar manner, wire stripper 10' is used to cut through and sever outer insulation jacket 92 a third selected distance (greater than the second selected distance) by inserting cable 90 a selected distance into the space defined between semicircular openings 36 and 60.

Referring now to FIG. 1, it can be seen that cutting blade 30 has been provided for two-level cutting in the same manner as described above for three-level cutting with reference to FIGS. 2-4.

Blades 30 and 30' can be economically molded in place to a preset dimension to provide one-piece wire strippers 10 and 10', respectively. Although the dimensions of any particular embodiment of wire stripper 10 or 10' are fixed, that embodiment can be used to cut and strip a range of cable sizes. For example, a wire cutter dimensioned nominally to cut and strip 0.250-inch diameter cable can satisfactorily cut and strip cables in the diameter range of 0.218 to 0.312 inch.

Figure 7:
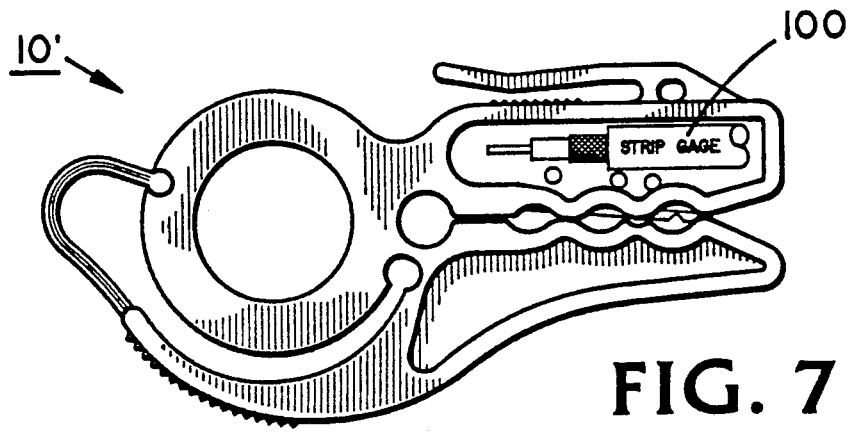
FIG. 7 is a side elevational view of the wire stripper of FIG. 2.

A particular advantage of the present invention is that the distance from the end of cable 90 that any particular cut is made is not fixed and can be determined by the user in the field. To aid the user in determining proper stripping lengths for a particular application, a "STRIP GAGE" 100 may be molded into wire stripper 10' as is shown on FIG. 7. the user can then hold the end of a cable against the "STRIP GAGE" to see where the various cuts should be made.

Wire strippers 10 and 10' may be economically injection molded of any suitable material, with cutting blades 30 and 30' being molded into the wire strippers.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A wire stripper, comprising;
   (a) generally elongate lower body member having first and second ends;
   (b) a generally elongate upper clamping member having first and second ends and generally overlying said lower body member;
   (c) an integral flexible hinge member joining said lower body member and said upper clamping member intermediate said respective first and second ends;
   (d) integral biasing means disposed at and between said first ends, so as to bias said first ends apart by rotation of said upper clamping member around said flexible hinge member, and so as to draw said second ends toward each other, and to permit said second ends to be drawn apart by the further tensioning of said biasing means by the rotation of said upper clamping member around said hinge member;
   (e) a cutting blade disposed in said second end of said lower body member along the major axis of said lower body member and extending above the upper surface thereof, such that a cable inserted between said second ends when said first ends are drawn together will come into cutting engagement with said cutting blade when said second ends are subsequently drawn together, and one or more layers of said cable will be severed by said cutting blade when said wire stripper is rotated about said cable in a plane orthogonal to the axis of said cable; and
   (f) said integral biasing means comprises a resilient spring arm extending between the distal ends of said lower body member and said upper clamping member.

2. A wire stripper, as defined in claim 1, wherein said cutting blade extends above said upper surface of said lower body member in a concave semicircular opening defined in said upper surface.

3. A wire stripper, as defined in claim 2, further comprising a concave semicircular opening defined in the lower surface of said upper clamping member facing said concave semicircular opening defined in said upper surface of said lower body member to provide a first pair of facing semicircular openings, such that said cable will be held in the space defined between said first pair of facing semicircular openings when said second ends are drawn together.

4. A wire stripper, as defined in claim 3, further comprising a second pair of facing semicircular openings.

5. A wire stripper, as defined in claim 4, further comprising a third pair of facing semicircular openings.

6. A wire stripper, as defined in claim 2, further comprising a V-notch defined in the edge of said cutting blade extending into said semicircular opening defined in said upper surface of said lower body member.

7. A wire stripper, as defined in claim 1, wherein said lower body member, said upper clamping member, said flexible hinge member, and said biasing means are injection molded as an integral part.

8. A wire stripper, as defined in claim 7, wherein said cutting blade is molded into said integral part during the injection molding thereof.

9. A wire stripper, as defined in claim 1, wherein said respective first ends can be drawn together, and said respective second ends drawn apart, by the insertion of a finger of a user in said hole and the pressing toward each other of said finger and an opposing thumb of said user placed on said first end of said upper clamping member.

10. A wire stripper, as defined in claim 9, wherein the drawing together of said respective first ends will terminate when said respective first ends engage each other.

11. A wire stripper, as defined in claim 1, further comprising a strip gage molded into a surface of said wire stripper, so that a user can determine the lengths of the layers of said cable to be cut by reference thereto.

12. A wire stripper, as defined in claim 1, wherein said spring arm is an integral extension of said first end of said upper clamping member, the distal end of said spring arm is to be inserted into an opening defined in the distal end of said first end of said lower body member and said spring arm becomes tensioned when said distal of said spring arm is so inserted.

13. A wire stripper, comprising
   (a) a generally elongate lower body member having first and second ends;
   (b) a generally elongate upper clamping member having first and second ends and generally overlying said lower body member;
   (c) an integral flexible hinge member joining said lower body member and said upper clamping member intermediate said respective first and second ends;
   (d) integral biasing means disposed at and between said first ends, so as to bias said first ends apart by rotation of said upper clamping member around said flexible hinge member, and so as to draw said second ends toward each other, and to permit said second ends to be drawn apart by the further tensioning of said biasing means by the rotation of said upper clamping member around said hinge member;
   (e) a cutting blade disposed in said second end of said lower body member along the major axis of said lower body member and extending above the upper surface thereof, such that a cable inserted between said second ends when said first ends are drawn together will come into cutting engagement with said cutting blade when said second ends are subsequently drawn together, and one or more layers of said cable will be severed by said cutting blade when said wire stripper is rotated about said cable in a plane orthogonal to the axis of said cable;
   (f) said cutting blade extends above said upper surface of said lower body member in a concave semicircular opening defined in said upper surface;

(g) a concave semicircular opening defined in the lower surface of said upper clamping member facing said concave semicircular opening defined in said upper surface of said lower body member to provide a first pair of facing semicircular openings, such that said cable will be held in the space defined between said first pair of facing semicircular openings when said second ends are drawn together; and (h) second and third pairs of facing semicircular openings.

14. A wire stripper, as defined in claim 13, further comprising a V-notch defined in the edge of said cutting blade extending into said semicircular opening defined in said upper surface of said lower body member.

15. A wire stripper, as defined in claim 13, wherein said lower body member, said upper clamping member, said flexible hinge member, and said biasing means are injection molded as an integral part.

16. A wire stripper, as defined in claim 15, wherein said cutting blade is molded into said integral part during the injection molding thereof.

17. A wire stripper, as defined in claim 13, wherein said biasing means comprises a resilient spring arm extending between the distal ends of said lower body member and said upper clamping member.

18. A wire stripper, as defined in claim 17, wherein said spring arm is an integral extension of said first end of said upper clamping member, the distal end of said spring arm is to be inserted into an opening defined in the distal end of said first end of said lower body member, and said spring arm becomes tensioned when said distal of said spring arm is so inserted.

19. A wire stripper, as defined in claim 13, wherein said respective first ends can be drawn together, and said respective second ends drawn apart, by the insertion of a finger of a user in said hole and the pressing toward each other of said finger and an opposing thumb of said user placed on said first end of said upper clamping member.

20. A wire stripper, as defined in claim 19, wherein the drawing together of said respective first ends will terminate when said respective first ends engage each other.

21. A wire stripper, as defined in claim 13, further comprising a strip gage molded into a surface of said wire stripper, so that a user can determine the lengths of the layers of said cable to be cut by reference thereto.

* * * * *